United States Patent Office 2,718,516
Patented Sept. 20, 1955

2,718,516

ISOCYANATO ESTERS OF ACRYLIC, METHACRYLIC, AND CROTONIC ACIDS

Newman M. Bortnick, Oreland, Pa., assignor to Rohm & Haas Company, Philadelphia, Pa., a corporation of Delaware No Drawing. Application November 8, 1952, Serial No. 319,603

12 Claims. (Cl. 260—86.1)

This invention relates to polymerizable isocyanato esters of acrylic acid, methacrylic acid, α-chloroacrylic acid and crotonic acid, all of which esters have the general formula

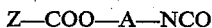

in which A represents an alkylene group, $C_nH_{2n}$, in which $n$ is an integer having a value of 2 to 14 inclusive, and in which Z represents the following groups: $CH_2=CH—$; $CH_2=C(CH_3)—$; $CH_2=C(Cl)—$; and $CH_3CH=CH—$. This invention also relates to the polymers of these isocyanato esters and to the copolymers of these esters and other copolymerizable compounds which contain at least one vinylidene group, $CH_2=C<$.

Esters having the above general formula undergo addition polymerization, particularly in the presence of a free-radical catalyst, and thereby form soluble, thermoplastic, resinous polymers of high molecular weight which contain a plurality of reactive isocyanate groups. The isocyanate groups in the polymers can, in turn, react with compounds containing, for example, amino, hydroxyl, mercapto or carboxyl groups, all of which groups contain reactive hydrogen atoms. In this way a wide variety of substituent groups can be added to the resinous molecules which increase the uses of the polymers. Furthermore, the isocyanate groups in the polymers are reactive with the hydroxyl or amino groups of carbohydrates, including cellulosic compounds, and of proteinaceous materials such as proteins per se and wool. Thus, the isocyanato polyesters serve to cross-link the molecules and greatly alter the physical and chemical properties of the carbohydrates and proteinaceous materials. Wool is readily altered and is rendered very resistant to shrinkage by treatment with the polymeric isocyanato esters of this invention since a true chemical reaction, involving the isocyanate groups, takes place between the polymer and the wool, as a result of which the wool and the polymer become chemically joined.

Not only do the polymeric isocyanato esters serve as cross-linking agents for other materials containing a plurality of reactive hydrogen atoms, but they can, themselves, be cross-linked and thus rendered substantially insoluble and infusible. For this purpose, compounds containing two or more active hydrogen atoms, such as polyamines, polyhydric alcohols, amino alcohols and polycarboxylic acids are employed. Examples of these include ethylenediamine, diethylenetriamine, triethylenetetramine, ethylene glycol, polyethylene glycols such as triethylene glycol, glycerol, pentaerythritol, sorbitol, mannito, oxalic acid, adipic acid, ethanolamine, diethanolamine and propanolamine. The polymeric isocyanato esters also react with the free hydroxyl or carboxyl groups of alkyd resins thus giving rise to new cross-linked products.

The monomeric isocyanato esters of this invention can be made by a variety of ways, but the method which has proven to be eminently suitable involves the procedural steps which are represented by the following general equations in which the various characters have the significance described above and X is a halogen atom—preferably a chlorine atom.

(I)
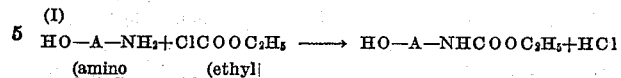

(II)
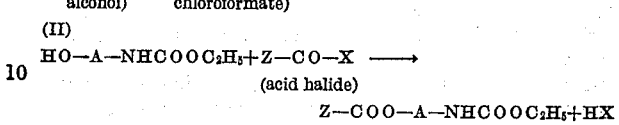

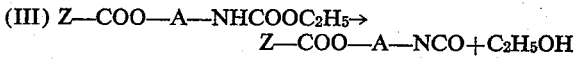

(III) Z—COO—A—NHCOOC₂H₅→
Z—COO—A—NCO + C₂H₅OH

This process may be more readily understood from the following equations which show the preparation of one particular isocyanato ester, namely β-isocyanatoethyl methacrylate:

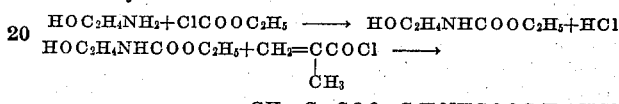

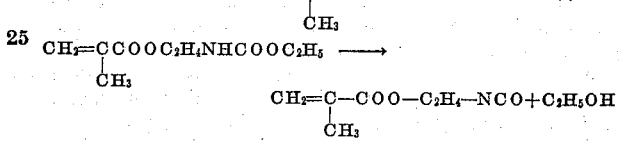

Step I of the process is best carried out by adding the chloroformate slowly to a solution of the amino alcohol in a solvent such as benzene, toluene, chloroform, methanol or ethanol. An HCl-acceptor, such as sodium hydroxide, potassium carbonate, pyridine, triethylamine or the like, should be present and, to assure best results, the temperature should not rise above 80 C.—preferably not above 60° C.—during the addition of the chloroformate. The mixture is then heated, preferably at refluxing temperature, until the reaction is substantially complete, after which the reaction product is freed of salt and solvent and is used as such or is purified by distillation.

In the second step of the process, represented by Equation II, it is most desirable to employ an HCl-acceptor. Here, however, the choice is more limited than in the step of Equation I because various complications may occur. Hence it is strongly recommended that acrylonitrile be employed in order to take up the liberated HCl and also to serve as a solvent for the reaction mixture. When compared with other materials, such as alkali metal compounds, pyridine and amines, acrylonitrile is surprisingly superior in this step.

The hydroxycarbamate, prepared in step I, is dissolved in acrylonitrile and the acrylyl chloride, Z—COCl, is added. The mixture is heated to above 80° C. at which point an exothermic reaction begins. After the exothermic reaction diminishes, the mixture is heated for a period of a few hours at about 80° C. after which it is stripped of acrylonitrile and β-chloropropionitrile. The urethano ester is purified, preferably by distillation under reduced pressure or can be used as such in the next step.

Another procedure for making the intermediate urethano ester involves the reaction of an ester, Z—COO—alkyl and a chloroalcohol according to these equations in which R″ is a lower alkyl group and MNCO is a metallic isocyanate such as KNCO or NaNCO:

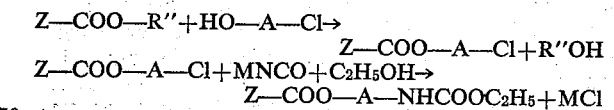

An example of this procedure is given later. Here the more readily available esters are employed instead of the acid halides. The process is, however, restricted for the most part to the use of those chloroalcohols where the carbon atom attached to the chlorine atom is a primary or secondary group. This procedure, therefore, is not recommended for the preparation of tertiary-carbinyl isocyanate esters.

In the third step (Equation III), which involves the conversion of the urethano ester to the isocyanato ester, it is recommended that phosphorous pentachoride be employed, especially when the carbon in group A which is attached to the urethane group is a primary carbon atom. The use of thionyl chloride is even better when that same carbon atom is a secondary one. Also, when that carbon atom is a secondary or a tertiary atom, the urethano esters can be converted to the corresponding isocyanato esters by heating in the presence of inorganic basic compounds such as a salt of a carboxylic acid and an alkali metal, or the water-soluble hydroxides of the alkaline earth metals or the water-insoluble oxides or hydroxides of the alkaline earth metals or of the heavy metals. The mixtures of urethano ester and basic catalyst are heated to a pot temperature from 170° C. to 300° C. and the isocyanato ester distils from the reaction mixture.

It is to be noted that the alklene groups, which are represented by the character A above, remain intact during all of the steps of the process. These groups, which originate in the amino alcohols, HO—A—NH₂, contain two to fourteen carbon atoms, and because they are saturated hydrocarbon groups they are inert so far as the process of making the isocyanato esters is concerned. The carbon atoms of the alkylene groups can be in a straight chain or they can be in a branched arrangement. While the groups themselves remain intact they do have an influence on the physical properties, such as solubility, of the monomeric esters and an effect on the chemical reactivity of the isocyanate groups. Those isocyanato esters, in which the alkylene groups contain a high number of carbon atoms, give rise to softer polymers than do those in which A contains fewer carbon atoms. Also the isocyanate groups are much less reactive when the carbon atoms of the alkylene groups which are attached to the isocyanate groups are secondary or tertiary by virtue of being attached to two or three other carbon atoms. In fact, the isocyanate groups which are attached to tertiary carbon atoms are so stable that the monomeric esters containing such a configuration can be polymerized while they are in the emulsified form. The following amino alcohols are typical of those which have been used successfully in this process:

HOCH₂CH₂NH₂, H₂N—CH₂CH(CH₃)—OH
HOCH₂CH₂CH₂NH₂, HOCH₂CH₂CH₂CH₂NH₂
HOCH₂CH(NH₂)—CH₂CH₃, HOCH₂C(CH₃)₂—NH₂
HOCH₂CH₂CH(CH₃)CH₂CH₂CH₂C(CH₃)₂—NH₂
CH₃CH(OH)CH₂C(CH₃)₂NH₂
(CH₃)₂C(NH₂)—CH₂CH₂OH, HOCH(C₂H₅)CH₂NH₂
HOCH(CH₃)CH₂CH₂NH₂

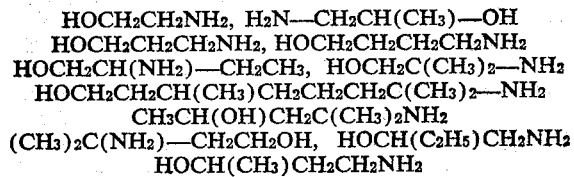

and

HOCH₂CH(C₆H₅)CH₂NH₂

The polymerization of the monomeric isocyanato esters of this invention, either alone or in mixtures with each other, or in copolymerizable mixtures with other kinds of copolymerizable compounds containing at least one vinylidene group, CH₂=C<, can be carried out in bulk or in solution. Also, as noted above, those isocyanato esters which have a tertiary carbon attached to the isocyanate group, can be polymerized in aqueous emulsion due to their unusual stability.

The products of this invention can be copolymerized with a wide variety of compounds containing a vinylidene group. Since, however, the isocyanate groups are reactive it is necessary to avoid those polymerizable unsaturated compounds which contain reactive hydroxyl, amino or carboxylic groups if a soluble, linear, thermoplastic copolymer is desired. Examples of copolymerizable materials which give rise to thermoplastic copolymers with the isocyanato esters of this invention include the following: N-dialkyl acrylamides such as dimethyl acrylamide and diethyl acrylamide; the alkyl esters of acrylic, α-chloroacrylic and methacrylic acids such as methyl acrylate, octyl acrylate, ethyl methacrylate, methyl methacrylate, butyl chloroacrylate and lauryl chloroacrylate; styrene, α-methylstyrene and vinylnaphthalene; vinyl chloride and vinylidene chloride; allyl and methallyl esters of saturated aliphatic carboxylic acids such as allyl acetate and methallyl propionate; acrylonitrile; vinylpyridine and the like. What is important here is the fact that copolymers can be made which contain a plurality of reactive isocyanate groups in each macromolecule; that the number of such reactive isocyanate groups can be varied by varying the proportions of the isocyanato ester and of the copolymerizable compound; and that the copolymer can be cross-linked and insolubilized, and thus acquire the properties of a thermoset resin, by reaction with a compound containing a plurality of groups which react with isocyanate groups, as described above. Or the isocyanate groups in the copolymers can react with reactive groups in proteinaceous compounds, such as glue or wool, and thereby combine chemically with the latter and greatly modify them.

The isocyanato esters of this invention can be copolymerized in all proportions with the materials noted above; and the particular ratio of comonomers chosen will depend upon the end use of the copolymer. At present it appears that at least 0.2%, on a weight basis, and preferably 1–50 per cent, of the isocyanato ester should be used in preparing the copolymers, inasmuch as this assures the presence of a plurality of reactive isocyanate groups in the macromolecules of the final copolymer.

Polymerization or copolymerization of the esters of this invention is accelerated by the use of heat, ultraviolet light and free-radical catalysts. There is always present the likelihood of reaction between the isocyanate groups of the esters and organic peroxidic catalysts and accordingly it is preferred to use a free-radical catalyst such as azoisobutyronitrile (α-α′-bis-azoisobutyronitrile), methyl azoisobutyrate and the like.

The following examples, in which all parts are by weight, are presented as a means of illustrating the preparation of the new isocyanato esters of this invention.

*Example 1*

A. Two mols of ethanolamine, HOC₂H₄NH₂, was dissolved in three times its weight of benzene in a 3-necked flask equipped with thermometer, stirrer, reflux condenser and dropping funnel. Then 2.2 mols of potassium carbonate was added after which 2.2 mols of ethyl chloroformate was added dropwise to the stirred solution. The temperature rose to 60° C. and was held at approximately this point by the use of a cooling bath and by regulation of the rate of addition of the ethyl chloroformate. After all of the ethyl chloroformate had been added, the reaction mixture was heated to boiling and was refluxed for two hours. The mixture was filtered and stripped of solvent up to a temperature of 85° C. at 15 mm. of pressure. A 95% yield was obtained of a compound whose analysis corresponded to that of the compound

HOC₂H₄NHCOOC₂H₅

In a similar way everyone of the amino alcohols listed above was reacted with ethyl chloroformate and a yield of 90% or more of the corresponding crude hydroxyurethane was obtained. Also the use of pyridine or triethylamine, in place of the sodium hydroxide, gave good results especially in those cases where the alkylene group of the amino alcohol was highly branched.

B. One mol of the hydroxyurethane, $$HOC_2H_4NHCOOC_2H_5$$

prepared as above in step A, was dissolved in 5 mols of acrylonitrile in a 3-necked flask equipped with thermometer, mechanical stirrer, reflux condenser and dropping funnel. One mol of methacrylyl chloride, $$CH_2=C(CH_3)COCl$$

was added dropwise over a period of 90 minutes during which the temperature was maintained at 80°–100° C. After the exothermic reaction had subsided, the mixture was heated on a steam bath for three hours. It was then cooled, filtered, and stripped of acrylonitrile and beta-chloropropionitrile under reduced pressure. The yield of crude product was 97% of theory. Analysis of a carefully distilled sample corresponded to that of the compound $CH_2=C(CH_3)—COOC_2H_4NHCOOC_2H_5$.

Acrylonitrile, which was employed as the solvent and also as the HCl-acceptor, gave rise to higher yields of the desired compound than were obtained when pyridine was employed in the same role, or when other HCl-acceptors such as tertiary amines or inorganic bases were used in conjunction with an auxiliary solvent such as benzene.

Another method which was fairly satisfactory for the preparation of acrylic acid esters, but less so for the preparation of the esters of the other acids, involved the use of the acid anhydride in place of the acid chloride and a weak organic base in place of the acrylonitrile.

The use of acrylonitrile as both solvent and HCl-acceptor in the preparation of all of the urethano esters of the unsaturated acids is strongly recommended. Its use is especially recommended in the preparation of the esters of acrylic acid because acrylic acid esters are themselves strong HCl-acceptors and in such cases a large excess, of the order of ten mols per mol of acrylic ester, is employed. It should be noted that lower alkyl esters of acrylic acid, such as the methyl to butyl esters, have themselves been used very successfully as HCl-acceptors in the preparation of the urethano esters of the other unsaturated acids.

C. Four hundred parts of mineral oil and 748 parts (3.6 mols) of $PCl_5$ were charged to a 3-necked flask equipped with a stirrer, thermometer, dropping funnel and a distillation adapter which led to a downward condenser and collector arranged for operation under reduced pressure. The contents of the flask was maintained at a temperature of 70° C. and a pressure of 120 mm. for 65 minutes during which time 725 parts (3.6 mols) of the compound, $CH_2=C(CH_3)—COOC_2H_4NHCOOC_2H_5$, prepared by the process of step B above, was added slowly in the molten condition. During this period HCl, $POCl_3$ and ethyl chloride were evolved and removed. The pressure was then lowered to 25 mm. and the mixture was held for 30 minutes. The pressure was next reduced to 10 mm. and heat was gradually applied until the pot temperature reached 170° C. The crude product was then subjected to a straight lead distillation and 371 parts, representing a 66% yield was obtained. This was next fractionated in a 14-plate column filled with stainless steel packing at a pressure of 3 mm. and the composition of the product, $CH_2=C(CH_3)—C_2H_4—NCO$ (boiling point 74–76° C./3 mm.) was confirmed by analysis.

In an altogether similar procedure, the following compounds were prepared in yields of 30–68%:

$$CH_2=C(CH_3)—COO—CH_2CH_2CH_2—NCO$$
$$CH_3CH=CH—COO—CH(CH_3)CH_2—NCO$$
$$CH_2=C(Cl)—COO—CH_2CH_2—NCO$$
$$CH_2=CH—COO—CH_2CH_2—NCO$$

and $$CH_2=C(CH_3)—COO—CH_2CH(C_2H_5)—NCO$$

Also results were essentially the same when thionyl chloride was used in place of the phosphorous pentachloride.

The process of step C, described immediately above, is not recommended for the production of isocyanato esters in which the carbon atom adjacent to the isocyanate group is a secondary or a tertiary carbon atom. These kinds of isocyanato esters are better prepared by pyrolyzing the urethano esters in the presence of about 10% of an inorganic basic compound such as an alkali metal salt of a carboxylic acid, or an oxide or hydroxide of an alkaline earth metal or of a heavy metal, typified by sodium acetate, potassium butyrate, lime, barium oxide, cerium oxide, cadmium oxide, basic lead carbonate and the like. The urethano esters and basic catalyst are mixed and heated under reduced pressure until the corresponding isocyanato ester and ethyl alcohol distil out. This process was used successfully in producing the following isocyanato esters from the corresponding urethano esters:

$$CH_2=C(CH_3)—COO—CH_2CH_2CH(CH_3)$$
$$CH_2CH_2CH_2C(CH_3)_2—NCO$$

$$CH_2=C(CH_3)—COO—CH_2CH_2CH_2C(CH_3)_2—NCO$$

$$CH_2=C(CH_3)—COO—CH_2C(CH_3)_2—NCO$$
$$CH_2=C(CH_3)—COO—CH(CH_3)CH_2C(CH_3)_2—NCO$$

$$CH_3CH=CH—COO—CH_2CH_2CH(CH_3)$$
$$CH_2CH_2CH_2C(CH_3)_2—NCO$$

and $$CH_3CH=CH—COO—CH_2CH(C_2H_5)—NCO$$

in yields from about 40 to 75 per cent of theory.

*Example 2*

The following is a typical example of an alternative method of making urethano esters which in turn are convertible to isocyanato esters by the process of step C in Example 1.

Ten mols of methyl methacrylate, 2 mols of 3-chloro-1-propanol, $ClCH_2CH_2CH_2OH$, and 5 parts of p-toluene sulfonic acid were heated at refluxing temperature for 15 hours in a flask equipped with thermometer, stirrer and a reflux condenser. An azeotropic mixture of methanol and methyl methacrylate was continuously removed. When 80% of the theoretical amount of methanol had separated the excess of methyl methacrylate was removed by distillation and a 77% yield of gamma-chloropropyl methacrylate (B. P. 95° C./21 mm.; $n_D^{20}=1.4526$; Cl=21.8%) was obtained.

A mixture of 0.5 mol of the ester, 0.5 mol of ethanol, 0.05 mol of potassium iodide, 0.55 mol of potassium cyanate, and 200 parts of dimethylformamide was stirred and heated at 85° C. for 72 hours. The mixture was filtered, and the filtrate was stripped of solvent and distilled under reduced pressure to give a 60% yield of the compound, $$CH_2=C(CH_3)—COO—CH_2CH_2CH_2—NHCOOC_2H_5$$

(B. P. 145°–150° C./2 mm.).

*Example 3*

Beta-isocyanatoethyl methacrylate, $$CH=C(CH_3)—COOCH_2CH_2NCO$$

was mixed with 0.05% of its weight of azoisobutyronitrile and was polymerized in a dilatometer tube at 60° C. The initial rate of polymerization was 15% per hour as measured by shrinkage in contrast to a rate of 6.5% for methyl methacrylate under the same conditions.

*Example 4*

Ten parts of beta-isocyanatoethyl methacrylate and 90 parts of methyl methacrylate were mixed with 0.05% by weight of azoisobutyronitrile and the mixture was heated under reduced pressure at 80° C. until the mixture became syrupy. Portions of the mixture were poured into plate glass molds which were then sealed and heated in an oven at 60° C. for 24 hours. After this period of heating the copolymer was solid, had an odor of the monomers, and was soluble in toluene. After being heated for one more hour at 110° C., the copolymer was no longer soluble in toluene but did swell eight-fold on immersion in toluene. After being heated for three additional hours at 180° C., the resultant casting was insoluble and infusible, had excellent clarity, greater abrasion resistance and craze resistance, and a higher heat-distortion temperature than a casting made from only methyl methacrylate under the same conditions.

*Example 5*

A mixture of 20 parts of beta-isocyanatoethyl methacrylate, 80 parts of stenyl acrylate and 0.05% by weight of azoisobutyronitrile and 200 parts of benzene were heated at refluxing temperature for 24 hours. A 98% yield of copolymer was obtained as measured by a solids-determination. The solution was applied to a sample of tanned leather. The leather was dried in an oven at 65° C. and on cooling was subjected to a flexing test in which a coated side of the leather was in contact with water. Several thousand flexures were required before a slight wetting of the other side of the leather was noted. A homopolymer of stenyl acrylate alone, prepared and tested in the same way, was far less durable or satisfactory.

*Example 6*

A mixture of 3 parts of beta-isocyanatoethyl methacrylate, 97 parts of methyl methacrylate, 1 part of azoisobutyronitrile and 200 parts of Cellosolve acetate was heated for 24 hours at 85° C. The resultant viscous solution was applied to glass and heated to 200° C. for 30 minutes. The resultant film was unaffected by immersion for 24 hours in toluene at 25° C. When heated in toluene at 50°–60° C. overnight, the clear film swelled 3-fold but did not dissolve.

*Example 7*

A portion of the solution of resin, obtained by the process of Example 6 above, was mixed with a Cellosolve acetate solution of hexamethylenediamine in such a ratio that one amino group was present for every isocyanato group in the copolymer. Within a few seconds, the mixed solution changed to a firm gel.

The solution of copolymer was also gelled rapidly by the addition of other amines such as ethylene diamine and 1,8-diamino-p-menthane.

Substitution of amino alcohols for the diamines above, in amounts such as to provide two reactive hydrogen atoms for every two isocynanate groups in the copolymer, gave soluble products which on being baked at 100° C. to 200° C. converted to cross-linked, thermoset films. Also the solutions gelled on standing at room temperature for a few days. Amino alcohols which gave such results were monoethanolamine, diethanolamine, isopropanolamine, 3-amino-butanol, 7-amino-3,7-dimethyl-1-octanol, and 4-amino-4-methyl-2-pentanol.

Simple glycols such as hexamethylene glycol, diethylene glycol, 1,10-decanediol and 1,3-butylene glycol as well as polyols including glycerol, pentaerythritol, sorbitol and mannitol reacted with the polymers and copolymers of the isocynanato esters in essentially the same way as did the diamines discussed above and gave rise to thermoset, cross-linked products. Alkyd resins containing free hydroxyl or carboxyl groups react in a similar manner to yield cross-linked products.

*Example 8*

A mixture of 20 parts of butyl acrylate, 5 parts of 7-isocyanato-3,7-dimethyl-1-octyl methacrylate, 1 part of a commercial emulsifying agent, 75 parts of water, 0.017 part of ammonium persulfate and 0.009 part of sodium hydrosulfite was stirred at room temperature. The temperature gradually rose to 45° C. as polymerization progressed and then fell to room temperature. A dry rubbery film of the resultant emulsion was soluble in toluene until it was heated at 100° C. or higher after which it became insoluble, as a result of the cross-linking of the copolymer.

I claim:

1. Polymerizable isocyanato esters of the general formula $$Z-COO-A-NCO$$

in which A represents an alkylene group containing 2 to 14 carbon atoms and in which Z is a radical from the class consisting of the following radicals:

$$CH_2=CH-, \quad CH_2=C(CH_3)-, \quad CH_2=C(Cl)-,$$

and $$CH_3CH=CH-$$

2. A polymerizable isocyanato ester having the formula $$CH_2=C(CH_3)-COOC_2H_4NCO$$

3. A polymerizable isocyanato ester having the formula $$CH_2=CHCOOC_2H_4NCO$$

4. A polymerizable isocyanato ester having the formula $$CH_2=C(CH_3)COOC_3H_6NCO$$

5. A polymerizable isocyanato ester having the formula $$CH_2=C(CH_3)COOCH_2C(CH_3)_2NCO$$

6. A polymerizable isocyanato ester having the formula $$CH_2=C(CH_3)COOCH_2CH_2CH(CH_3)CH_2CH_2CH_2C(CH_3)_2NCO$$

7. A polymer of an isocyanato ester having the general formula $$Z-COO-A-NCO$$

in which A represents an alkylene group containing 2 to 14 carbon atoms and in which Z is a radical from the class consisting of the following radicals:

$$CH_2=CH-, \quad CH_2=C(CH_3)-, \quad CH_2=C(Cl)-$$

and $$CH_3CH=CH-$$

8. A copolymer containing (a) 0.2 to 50 per cent by weight of a copolymerized isocyanato ester having the general formula $$Z-COO-A-NCO$$

in which A represents an alkylene group of 2 to 14 carbon atoms and Z is a radical from the class consisting of the following radicals:

$$CH_2=CH-, \quad CH_2=C(CH_3)-, \quad CH_2=C(Cl)-$$

and $$CH_3CH=CH-$$

and (b) 50 to 99.8 per cent of a copolymerizable compound containing a vinylidene group, $CH_2=C<$.

9. A copolymer containing (a) 1 to 50 per cent by weight of the copolymerized isocyanato ester having the formula $$CH_2=C(CH_3)COOC_2H_4NCO$$

and (b) 50 to 99 per cent of copolymerized methyl methacrylate.

10. A copolymer containing (a) 1 to 50 per cent by weight of the copolymerized isocyanato ester having the formula $$CH_2=C(CH_3)COOCH_2C(CH_3)_2NCO$$

and (b) 50 to 99 per cent of copolymerized methyl methacrylate.

11. A copolymer containing (a) 1 to 50 per cent by weight of the copolymerized isocyanato ester having the formula

CH₂=C(CH₃)COOCH₂CH₂CH(CH₃)
CH₂CH₂CH₂C(CH₃)₂NCO and (b) 50 to 99 per cent of copolymerized butyl acrylate.

12. In the preparation of an ester having the formula

Z—COO—A—NHCOOC₂H₅ in which Z is a radical from the class consisting of the following radicals:

CH₂=CH—, CH₂=C(CH₃)—, CH₂=C(Cl)— and

CH₃CH₂=CH— and in which A represents an alkylene group containing 2 to 14 carbon atoms, by the reaction of a compound having the formula

HO—A—NHCOOC₂H₅ with a compound having the formula

Z—CO—Cl in which formulas Z and A are identical with the same characters described above, the improvement which comprises carrying out the reaction in the presence of acrylonitrile as a solvent for the reaction mixture and as an HCl-acceptor.

References Cited in the file of this patent

UNITED STATES PATENTS

| | | |
|---|---|---|
| 1,851,040 | Fihentscher | Mar. 29, 1932 |
| 2,129,694 | Izard | Sept. 13, 1938 |
| 2,468,713 | Kropa et al. | Apr. 26, 1949 |
| 2,503,209 | Nyquist et al. | Apr. 4, 1950 |
| 2,626,278 | Wystrach et al. | Jan. 20, 1953 |

OTHER REFERENCES

Iwahura, Chem. High Polymers (Japan), 2, 316–18 (1945): Chem. Abs. 1950, page 5104.